Nov. 14, 1961 W. H. COX 3,008,792
METHOD AND APPARATUS FOR REPRODUCTION AND
DISPLAY SEISMIC RECORDS
Filed Aug. 5, 1957

INVENTOR.
WILLIAM H. COX
BY
ATTORNEYS

United States Patent Office 3,008,792
Patented Nov. 14, 1961

3,008,792
METHOD AND APPARATUS FOR REPRODUCTION AND DISPLAY OF SEISMIC RECORDS
William H. Cox, Beaumont, Tex., assignor to Sun Oil Company, Philadelphia, Pa., a corporation of New Jersey
Filed Aug. 5, 1957, Ser. No. 676,081
5 Claims. (Cl. 346—33)

This invention relates to a method and apparatus for reproduction and display of seismic records, and has particular reference to the treatment of records produced in seismic prospecting.

The conventional reproduction of seismic records by the formation of side-by-side traces in an oscillograph gives rise to a display which, while it contains all of the desired information, is rather difficult to interpret and it is sometimes particularly difficult to determine the precise time of occurrence of reflections or other features which are of primary interest.

Attempts have, accordingly, been made to reproduce seismic records in forms which serve for more effective display. For example, it has been proposed to provide ultimate records in the form of variable density traces which may be reproduced side-by-side for the various channels used in making a single record, with side-by-side location of these records to provide a final display showing striations to accentuate correlation between records. The variable density record, however, while it lends itself to such display, inherently becomes relatively unmeasurable from the standpoint of ascertaining times at which various events such as reflections were received. This is due to the fact that the peaks and valleys of amplitude become reproduced as dark or light regions grading in density but particularly having slow rate of gradation at the peaks and valleys so that the maxima or minima of these cannot be ascertained with accuracy. Wave shape is almost completely lost in such a record, and it can only be effectively used in conjunction with the conventional oscillograph traces.

It has also been proposed to provide oscillograph traces from which everything is eliminated except the regions of crossing of the axis. The result of this is a dot-type pattern, but there is the serious drawback that the dots in photographic reproduction are lightest where the slope of the amplitude in passing through zero is a maximum, i.e., flanking intense peaks or valleys. Furthermore, such a record completely loses the aspect of supplying a measure of peak intensities. These cannot be adequately judged from the intensity of the dots produced. It is one object of the present invention to provide a method and apparatus for the reproduction and display of seismic records giving rise to a display in which there is inherently substantially more information than has been heretofore secured by the methods just outlined and others. In brief, in a preferred embodiment of the invention, an amplitude signal derived from a record is differentiated, and the resulting differentiated signal is then clipped, again subjected to differentiation, and the resulting signal is then used to produce photographically or otherwise variable density traces which take the form of variable density dots. The individual dots then correspond to peaks and valleys of the original record, with the intensities of the dots proportional to original amplitude and additionally with the dots occurring at the times of the peaks and valleys which they represent. A single trace is thus somewhat similar to a variable density trace of the original record, with the exception that the peaks and valleys are not spread out, but rather, the more intense the peak or valley the shorter is the dot representative of it so as to mark accurately the maximum or minimum. As will appear hereafter, various modifications may be utilized and, in some cases, simultaneously to give a greater amount of information as, for example, so as to distinguish between peaks and valleys.

The objects of the invention have to do with the attainment of the foregoing results, and will become apparent from the following description, read in conjunction with the accompanying drawing, in which.

Figure 3:
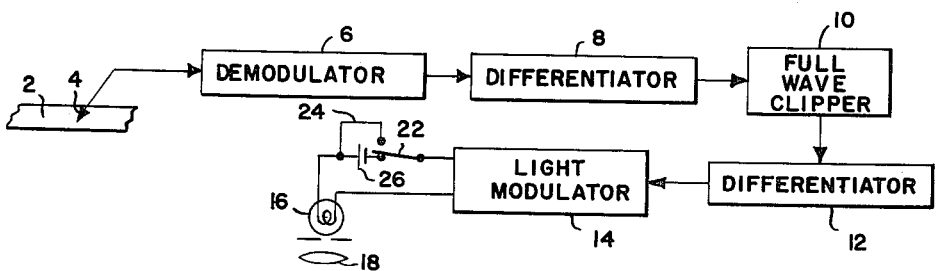
FIGURE 3 is a block diagram illustrating the type of apparatus preferably employed.

Preliminary, to provide a background, there may be made brief reference to FIGURE 3 which diagrams the apparatus which may be employed.

At 2 there is indicated a record which is to be reproduced in accordance with the invention. This will usually be a record which has been reproduced from an original record made in the field through the application of delays, filtering, or other procedures conventionally used to process original records to make them more meaningful. The record 2 may be of any of various types thus produced. It may be assumed, for purposes of this description, that it is a magnetic tape record the signals on which consist of one or more carriers modulated with the seismic wave which has been processed. This is presently the most common type of record which is used, a modulated carrier being involved so that the differentiation inherent in magnetic reproduction will only effect phase shift of the carrier with negligible phase shift of the modulating seismic wave. However, since as will shortly appear, the seismic wave is desirably differentiated, the magnetic record may be of the seismic wave itself rather than of a modulated carrier. As is usual, there will generally be on such a record a number of channels corresponding to the number of original detectors or corresponding to various cross combinations of detector outputs. For simplicity the description will continue as to a single channel, with the understanding that in general, in practice, all of the channels will be treated separately in the same fashion to give rise to an ultimate multi-channel record.

It will, of course, be obvious that variable density records may be photoelectrically scanned to produce the same results.

Considering a single channel, the pickup 4 will deliver its output to a demodulator 6 wherein the carrier is removed and there is provided as an output the seismic signals. (It will be understood that in the diagram shown in FIGURE 3 there may be various amplification stages incorporated in the elements shown.)

The signal delivered from the demodulator is then preferably differentiated in a conventional differentiator 8. As will appear hereinafter, for certain purposes this differentiator may be omitted, the signal from the demodulator 6 being directly fed to the full wave clipper 10. Continuing reference to the preferred arrangement, the signal from the differentiator is fed to the clipper 10 wherein there are removed the peaks and valleys of the input signal exceeding some chosen amplitude, there being desirably delivered from the clipper signals which correspond solely to those portions of the signal it receives in the vicinity of the zero axis. The output of the clipper 10 is then subjected to differentiation in a differentiator 12 and the output of this differentiator is fed to a light modulator 14 which is simply an amplifier to provide output current pulses to a lamp 16 which through an optical system 18 projects a dot of light on a photographic film 20 which is advanced in linear synchronism with the record 2. A switch 22 is provided by which the output may be delivered directly to the lamp through connection 24 to provide light intensity pulses irrespective of the sign of the output of the modulator. Alternatively, the switch may be thrown to a position to feed the signals through a biasing battery 26 so that only those pulses of a single sign will produce illumination of the lamp.

Figure 1:
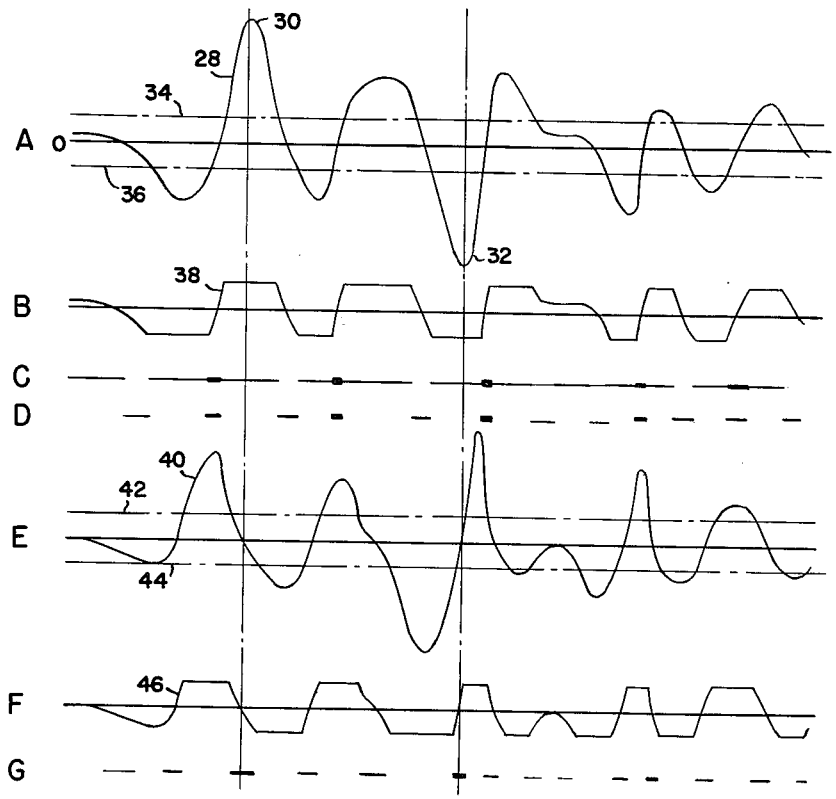
FIGURE 1 is a graph depicting the results of various steps carried out in accordance with the invention.

What specifically occurs, and the significance thereof may be best appreciated by considering FIGURE 1.

In this figure there is indicated at A in the form of an amplitude function 28 the seismic signal delivered by the demodulator 6. As indicated particularly at 30 and 32, this signal will generally contain some outstanding peaks and valleys, peaks being indicated as positive and valleys as negative. Such peaks and valleys may be indicative of reflections or other events of primary interest. The other deviations of the signal may be due to noise or to earth vibrations which are not of special significance. The large peaks and valleys are of special significance from the standpoint of amplitude and times of their maximum values. As will appear hereafter, the invention preserves these characteristics.

In certain cases it is desirable to proceed with the clipping by clipper 10 without preliminary differentiation, and this will first be described, the demodulator 6 then feeding signals such as indicated at A directly to the clipper 10. Clipping is effected at the amplitude levels 34 and 36 and has as its result the delivery from the clipper of a signal such as shown in curve B and indicated at 38. As will be noted, this curve 38 preserves only those parts of the original wave in the vicinity of crossings of the axis. Where a large positive or negative peak has occurred, the curve crosses the axis with a considerable slope, whereas when the peaks are smaller the axis crossings are generally at a lesser angle.

In accordance with the invention, the signal indicated at B is differentiated and the derivative signal through the light modulator is used to control the intensity of the lamp 16. Since the excursion of curve B is always between the same amplitudes, the output to the lamp is essentially the same, but the duration of the energy output is shorter for the steeper slopes and longer for the more gradual slopes. The exposure produced by the lamp when a biasing battery such as 26 is used is typically indicated at C, which represents the photographic densities of the dots produced on the record 20 upon development. For the positive excursions of curve B there are dots which are denser and shorter as the slopes of the positive excursions increase. The negative excursions, on the other hand, produce less exposure and may appear as gaps as illustrated at C.

On the other hand, if a biasing battery is not used, both the positive and negative excursions will produce exposures varying in intensity in the fashion just described. These results are indicated at D. It will be understood that it is desirable to use a lamp of low thermal inertia so as to make use of even the shortest signals applied thereto. As is well known, the intensity of illumination of a filament lamp is not linearly proportional to the filament current, but increases more rapidly than the first power of the current. Thus the more rapid excursions are substantially accentuated.

As has been stated, the type of record shown at either C or D may sometimes be useful, but it has the disadvantage that the dots do not correspond to the maxima of the signal A, but rather flank the peaks and valleys to which they correspond. In accordance with what will now be described, the dots are produced at times corresponding to the maxima, and their intensities are more nearly indicative of amplitudes.

At E there is shown by curve 40 the first derivative with respect to time of the signal at A, and a signal corresponding to 40 will be provided by the differentiator 8 which may take the conventional simple form of a capacitance-resistance combination, since usually precise differentiation is not required. It will be noted that in the case of curve 40, crossings of the axis correspond quite accurately to the maxima of the excursions of signal A. Full wave clipping of the signal E is effected at the levels 42 and 44 with the production from the clipper 10 of the wave shown at 46 in F. The clipped wave 46 is then differentiated by differentiator 12 and serves through the light modulator to feed current to the lamp 16 either with or without biasing as may be desired. At G there are indicated the results which are produced without biasing, dots being then provided in correspondence with both positive and negative excursions of the curve 46. If biasing is used, results similar to those indicated at C are obtained.

It will be noted that the record produced corresponding to G provides dots at the crossings of the axis of both signals E and F, and these correspond in time to the peaks of the original signal A, both the positive and negative peaks being thus indicated at G. Furthermore, the intensities of the dots correspond to the amplitudes of these positive and negative peaks, this result following from the fact that the slopes of the differentiated signal E are steepest when they correspond to the largest excursions of the signal A. Thus the times of peaks are preserved and accurately indicated and dot intensities serve as a visual indication of the peak amplitudes.

When a plurality of records such as shown at G are located side-by-side, as they may be by providing multiple side-by-side channels on the photographic record 20 corresponding to the channels on the record 2, the dots, particularly if closely aligned side-by-side produce the appearance of transverse lines. This is illustrated at 48 in FIGURE 2. Furthermore, if various records made from successive shots in the usual sequences of shooting are placed side-by-side, lines of corresponding dots will appear as continuations across the records to afford readily interpretable displays.

Figure 2:
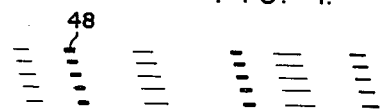
FIGURE 2 is a fragmentary section of a set of records showing how they may be read to give the desired information.

It will be evident that by comparison of records produced, respectively, with and without lamp bias, the signs of the peaks of the original record may be ascertained, and this may provide additional information. Furthermore, records of the type indicated at G may be studied in association with records such as provided at C or D to secure still more adequate pictures of the records. A record such as that shown in FIGURE 2, of course, does not contain all of the characteristics of the original record which may be reproduced through an oscillograph. It is desirable, therefore, to utilize a record such as that of FIGURE 2 in conjunction with a conventional oscillograph record from which the "character" of the wave may be determined. However, a record such as that of FIGURE 2 provides an excellent preliminary picture and from it, in particular, the times of major peaks may be readily determined. Minor points of inflection and other subtle variations in waveform termed "phasing," may be studied from the conventional oscillograph record.

Figure 4:
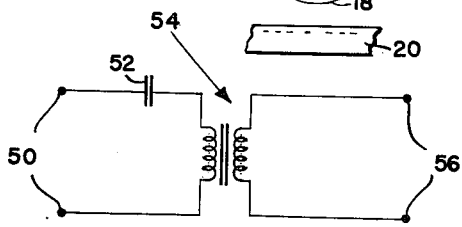
FIGURE 4 is a wiring diagram showing the circuitry of one of the elements illustrated in FIGURE 3.

While in FIGURE 3, the differentiator 8, full wave clipper 10 and differentiator 12 are shown as separate elements, and may well be, each being of conventional form, there is illustrated in FIGURE 4 a very simple arrangement which corresponds to all three of these elements in producing the same overall result. This comprises terminals 50 connected to the primary of a "peaking" transformer 54 through a small series capacitor 52, with output terminals 56 connected to the secondary of this transformer. The peaking transformer is of the type involving saturation to act as a limiter, such transformers being conventional and available on the market. The action is as follows:

Signals from the demodulator 6 are fed to the input terminals 50. By reason of the small series capacitor, the primary current of the transformer is proportional to the first derivative of the input voltage, and this effects the result of the differentiator 8. By reason of the saturable nature of the transformer, it automatically effects full wave clipping, and furthermore produces a voltage output at terminals 56 which is proportional to the first derivative of the primary current. This last differentiating action corresponds to that of differentiator 12. The output terminals 56 may be connected to the light modulator to provide its input.

It will be evident that various details may be changed without departing from the invention as defined in the following claims.

What is claimed is:

1. Apparatus for the production of visible seismic records comprising means providing variable amplitude alternating signals at seismic frequencies, means for clipping the last mentioned signals to remove portions thereof exceeding predetermined amplitude values thereby producing second signals predominantly of flat-top waveform but at the same seismic frequencies, means for differentiating said second signals to provide third signals having magnitudes varying with the rate of change of said second signals, and means providing a variable density record of said third signals in which record the density varies with the magnitude of said third signals.

2. Apparatus for the production of visible seismic records comprising means for providing variable amplitude seismic signals, means for differentiating said seismic signals to provide variable amplitude alternating signals at seismic frequencies, means for clipping the last mentioned signals to remove portions thereof exceeding predetermined amplitude values thereby producing second signals predominantly of flat-top waveform but at the same seismic frequencies, means for differentiating said second signals to provide third signals having magnitudes verying with the rate of change of said second signals, and means providing a variable density record of said third signals in which record the density varies with the magnitude of said third signals.

3. Apparatus for the production of visible seismic records comprising means for providing variable amplitude seismic signals, means for differentiating said seismic signals to provide variable amplitude alternating signals at seismic frequencies, means for clipping the last mentioned signals to remove portions thereof exceeding predetermined amplitude values thereby producing second signals predominantly of flat-top waveform but at the same seismic frequencies, means for differentiating said second signals to provide third signals having magnitudes varying with the rate of change of said second signals, and means providing a variable density record of said third signals in which record the density varies with the magnitude of said third signals, said first differentiating means, the clipping means and the second differentiating means being provided by a peaking transformer having a capacitance in series with its primary.

4. Apparatus for the production of visible seismic records comprising means providing variable amplitude alternating signals at seismic frequencies, means for clipping the last mentioned signals to remove portions thereof exceeding predetermined amplitude values thereby producing second signals predominantly of flat-top waveform but at the same seismic frequencies, means for differentiating said second signals to provide third signals having magnitudes varying with the rate of change of said second signals, and means providing a variable visible pulse record of said third signals in which record the visible pulses vary with the magnitude of said third signals.

5. Apparatus for the production of visible seismic records comprising means for providing variable amplitude seismic signals, means for differentiating said seismic signals to provide variable amplitude alternating signals at seismic frequencies, means for clipping the last mentioned signals to remove portions thereof exceeding predetermined amplitude values thereby producing second signals predominantly of flat-top waveform but at the same seismic frequencies, means for differentiating said second signals to provide third signals having magnitudes varying with the rate of change of said second signals, and means providing a variable visible pulse record of said third signals in which record the visible pulses vary with the magnitude of said third signals.

References Cited in the file of this patent

UNITED STATES PATENTS

| | | |
|---|---|---|
| 2,304,740 | Minton | Dec. 8, 1942 |
| 2,364,209 | Green | Dec. 5, 1944 |
| 2,767,388 | Rust | Oct. 16, 1956 |
| 2,791,288 | Meier | May 7, 1957 |
| 2,877,080 | Eisler | Mar. 10, 1959 |
| 2,897,351 | Melton | July 28, 1959 |
| 2,928,708 | Ellison | Mar. 15, 1960 |
| 2,940,061 | Piety | June 7, 1960 |
| 2,941,184 | Moody | June 14, 1960 |